United States Patent
Jain et al.

(10) Patent No.: US 12,130,730 B2
(45) Date of Patent: Oct. 29, 2024

(54) DETERMINING TEST CASES TO BE RUN UPON CHANGES IN SOFTWARE APPLICATION CODE

(71) Applicant: Oracle International Corporation, Redwood Shores, CA (US)

(72) Inventors: Nilesh Jain, Bangalore (IN); Krishnananda Subbarao, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 89 days.

(21) Appl. No.: 17/812,459

(22) Filed: Jul. 14, 2022

(65) Prior Publication Data
US 2024/0020219 A1 Jan. 18, 2024

(51) Int. Cl.
*G06F 11/36* (2006.01)
*G06F 8/71* (2018.01)

(52) U.S. Cl.
CPC ........... *G06F 11/3688* (2013.01); *G06F 8/71* (2013.01)

(58) Field of Classification Search
CPC ....................................................... G06F 11/36
See application file for complete search history.

(56) References Cited

U.S. PATENT DOCUMENTS

| | | | | |
|---|---|---|---|---|
| 8,276,123 B1* | 9/2012 | Deng | ............ | G06F 11/368 717/124 |
| 2011/0219359 A1* | 9/2011 | Gupta | ............ | G06F 11/3684 717/124 |
| 2023/0068689 A1* | 3/2023 | Dutta | ............ | G06F 11/3676 |
| 2023/0333969 A1* | 10/2023 | Zhang | ............ | G06F 11/3636 |

* cited by examiner

*Primary Examiner* — Duy Khuong T Nguyen
(74) *Attorney, Agent, or Firm* — IPHORIZONS PLLC; Narendra Reddy Thappeta

(57) ABSTRACT

An aspect of the present disclosure determines test cases to be run upon changes in software application code. In one embodiment, a system receives a test suite containing multiple test cases designed to perform the testing of a software application, the software application containing one or more components. The system executes each test case to determine a corresponding sequence of components executed in the software application for the test case, and then stores a dependency data indicating for each test case the corresponding determined sequence of components. Upon determining that a first component has been changed, the system identifies a first set of test cases that cause execution of the first component by performing a reverse look-up in the dependency data. The system then includes the identified first set of test cases in the test cases to be run for re-testing the software application.

17 Claims, 15 Drawing Sheets

```
com.acme.tls.ImportScenTestCase          -> com.acme.tls.ImportScenTestCase$1         not found
com.acme.tls.ImportScenTestCase          -> com.acme.tls.ImportScenTestCase$2         not found
com.acme.tls.ImportScenTestCase          -> com.acme.tls.ImportScenTestCase$3         not found
com.acme.tls.ImportScenTestCase          -> com.acme.tls.ImportScenTestCase$4         not found
com.acme.core.OdiInstance                                 not found   com.acme.tls.ImportScenTestCase        ->
com.acme.core.pers.dwgobject.DwgObjectTemplate not found  com.acme.tls.ImportScenTestCase        ->
com.acme.core.pers.transaction.ITransactionDefinition not found   com.acme.tls.ImportScenTestCase    ->
com.acme.core.pers.transaction.ITransactionManager not found  com.acme.tls.ImportScenTestCase        ->
com.acme.core.pers.transaction.support.DefaultTransactionDefinition not found  com.acme.tls.ImportScenTestCase
-> com.acme.core.pers.transaction.support.ITransactionCallback not found  com.acme.tls.ImportScenTestCase        -
> com.acme.core.pers.transaction.support.TransactionTemplate not found  com.acme.tls.ImportScenTestCase        ->
com.acme.core.security.SecurityManager              not found  com.acme.tls.ImportScenTestCase        ->
com.acme.core.security.cryptography.CipherFactory not found   com.acme.tls.ImportScenTestCase        ->
com.acme.core.security.cryptography.IOdiCipher      not found   com.acme.tls.ImportScenTestCase        ->
com.acme.core.dom.IOdiEntity                        not found   com.acme.tls.ImportScenTestCase        ->
com.acme.dom.project.OdiProject                     not found   com.acme.tls.ImportScenTestCase        -> 
com.acme.dom.project.finder.IOdiFolderFinder        not found   com.acme.tls.ImportScenTestCase        -> 
com.acme.dom.project.finder.IOdiPackageFinder       not found   com.acme.tls.ImportScenTestCase        -> 
com.acme.dom.project.finder.IOdiProjectFinder       not found   com.acme.tls.ImportScenTestCase        -> 
com.acme.dom.runtime.scenario.OdiScenario           not found   com.acme.tls.ImportScenTestCase        -> 
com.acme.dom.runtime.scenario.OdiScenarioFolder     not found   com.acme.tls.ImportScenTestCase        -> 
com.acme.dom.runtime.scenario.finder.IOdiScenarioFinder not found  com.acme.tls.ImportScenTestCase     -> 
com.acme.dom.runtime.scenario.finder.IOdiScenarioFolderFinder not found  com.acme.tls.ImportScenTestCase
com.acme.testframework.AbstractOdiInstanceTestCase not found
```

*FIG. 5B*

```
# startCaptureAt: The short name of the class at which the capture will start
startCaptureAt = ImportScenTestCase instrumentationClassPattern: comma separated pattern (regexp) for the classes to be instrumented; if
not specified no class will be instrumented
instrumentationClassPattern = .*ImportScenTestCase.*, .*OdiScenarioFolder.*, .*IOdiScenarioFinder.*,
.*IOdiScenarioFolderFinder.* javassitExtraClassPath: comma separated locations for classes and jars required by javassist during
instrumentation (if the need arises: specially
# during instrumentation of a programs running on a web application server such as JBoss and Tomcat,)
javassitExtraClassPath = /scratch/com/acme/sdk/lib/odi-core.jar

# Record the full class name (full package) instead of a short one (default is too record the short class
names)
useFullPackageClassName = false
```

*FIG. 5C*

```
START_+--->ImportScenTestCase   (1:testImportScenWithScenFolder)
        ImportScenTestCase+--->ImportScenTestCase    (2:createProjectAndExportScenario)
                ImportScenTestCase+--->ImportScenTestCase$1    (3:ImportScenTestCase$1)
                ImportScenTestCase<---+ImportScenTestCase$1    (4)
                ImportScenTestCase+--->ImportScenTestCase$1    (5:doInTransaction)
                        ImportScenTestCase$1+--->ImportScenTestCase    (6:access$000)
                        ImportScenTestCase$1<---+ImportScenTestCase    (7)
                        ImportScenTestCase$1+--->ImportScenTestCase    (8:access$000)
                        ImportScenTestCase$1<---+ImportScenTestCase    (9)
                        ImportScenTestCase$1+--->ImportScenTestCase    (10:access$100)
                        ImportScenTestCase$1<---+ImportScenTestCase    (11)
                        ImportScenTestCase$1+--->ImportScenTestCase    (12:access$200)
                        ImportScenTestCase$1<---+ImportScenTestCase    (13)
                        ImportScenTestCase$1+--->ImportScenTestCase    (14:access$300)
                        ImportScenTestCase$1<---+ImportScenTestCase    (15)
                        ImportScenTestCase$1+--->ImportScenTestCase    (16:access$400)
                        ImportScenTestCase$1<---+ImportScenTestCase    (17)
                        ImportScenTestCase$1+--->OdiScenarioFolder     (18:OdiScenarioFolder)
                                OdiScenarioFolder+--->OdiScenarioFolder (19:setName)
                                OdiScenarioFolder<---+OdiScenarioFolder (20)
                        ImportScenTestCase$1<---+OdiScenarioFolder     (21)
                        ImportScenTestCase$1+--->ImportScenTestCase    (22:access$500)
                        ImportScenTestCase$1<---+ImportScenTestCase    (23)
                        ImportScenTestCase$1+--->OdiScenarioFolder     (24:getName)
                        ImportScenTestCase$1<---+OdiScenarioFolder     (25)
                        ImportScenTestCase$1+--->OdiScenarioFolder     (26:OdiScenarioFolder)
                        ImportScenTestCase$1<---+OdiScenarioFolder     (27)
                        ImportScenTestCase$1+--->ImportScenTestCase    (28:access$600)
                        ImportScenTestCase$1<---+ImportScenTestCase    (29)
                        ImportScenTestCase$1+--->ImportScenTestCase    (30:access$700)
                        ImportScenTestCase$1<---+ImportScenTestCase    (31)
                ImportScenTestCase<---+ImportScenTestCase$1    (32)
                ImportScenTestCase+--->OdiScenarioFolder  (33:getInternalId)
                        OdiScenarioFolder+--->OdiScenarioFolder  (34:getScenarioFolderId)
                        OdiScenarioFolder<---+OdiScenarioFolder  (35)
                ImportScenTestCase<---+OdiScenarioFolder  (36)
                ImportScenTestCase+--->OdiScenarioFolder  (37:getInternalId)
                        OdiScenarioFolder+--->OdiScenarioFolder  (38:getScenarioFolderId)
                        OdiScenarioFolder<---+OdiScenarioFolder  (39)
                ImportScenTestCase<---+OdiScenarioFolder  (40)
                ImportScenTestCase+--->OdiScenarioFolder  (41:OdiScenarioFolder)
                ImportScenTestCase<---+OdiScenarioFolder  (42)
```

*FIG. 5E*

| "TESTCASECLASSNAME" | "DEPENDENTCLASS" | "DEPENDENTMETHOD" | "LASTUPDATEON" |
|---|---|---|---|
| "ImportScenTestCase " | "OdiScenarioFolder " | "OdiScenarioFolder" | "08-01-2022 23:07" |
| "ImportScenTestCase " | "OdiScenarioFolder " | "setName" | "08-01-2022 23:07" |
| "ImportScenTestCase " | "OdiScenarioFolder " | "getName" | "08-01-2022 23:07" |
| "ImportScenTestCase " | "OdiScenarioFolder " | "getInternalId" | "08-01-2022 23:07" |
| "ImportScenTestCase " | "OdiScenarioFolder " | "getScenarioFolderId" | "08-01-2022 23:07" |
| "ImportScenTestCase " | "OdiScenarioGeneratorImpl " | "OdiScenarioGeneratorImpl" | "08-01-2022 23:07" |

*FIG. 5F*

```
ADE Transaction Information:
TRANSACTION: ****
TRANS_LOCATION: /scratch/txn_storage/bug-32639667
BASE_LABEL: ****
OWNING VIEW: NONE
HOST NAME: ****
DESCRIBING VIEW: ****
TRANS_STATE: CLOSED ALL AFFECTED FILES:
   1.   odi/src/com/acme/DwgDuplicationTools.java #1 -> main/344
   2.   odi/src/com/acme/dbobj/SnpMapping.java #8 -> main/62
   3.   odi/src/com/acme/impexp/ImportExportTestCase.java #1 -> main/93

Connecting to Repository... Connected.
TRANSACTION PROPERTIES:
****
```

FIG. 6B

```
classNme:::::::>>>>>>>>>>::::::com.acme.DwgDuplicationTools.class
:::::javaFileNameDwgDuplicationTools
:::::sb.toString():::::::::duplicationInsertObject
```

FIG. 6C

| "TESTCASECLASSNAME" | "DEPENDENTCLASS" | "DEPENDENTMETHOD" |
|---|---|---|
| "Bug21251801TestCase " | "SnpMapping " | "getForeignKeyLst" |

FIG. 6D

| BASECLASS | "DEPENDENTCLASS" | "DEPENDENTCLASSMETHOD" |
|---|---|---|
| "SnpMapping" | "IOdiEntityManager" | "..." |
| "SnpMapping" | "DwgObjectTemplate" | "..." |
| "SnpMapping" | "IMasterMaybeWorkRepositoryDwgObjectCallback" | "..." |
| "SnpMapping" | "ITransactionManager" | "..." |
| "SnpMapping" | "ITransactionCallback" | "..." |
| ... | ... | ... |
| "SnpMapping" | "OdiBulkLoad" | "..." |
| "SnpMapping" | "OdiBulkLoadJob" | "..." |
| "SnpMapping" | "OdiProject" | "..." |

*FIG. 6E*

OdiContextualSchemaMappingTestCase
ChildrenAuthorizedForConsultTestCase
OdiUserFunctionTestCase
Migration_InterfaceUpgradeTestCase_Config2_GuidFalse_SdkFalse_KmTrue_ExcludeInvalidInterfaces
OdiProcedureLineTestCase
XMLSplitDTDResolverTestCase
InteractiveInterfaceHelperTargetColumnOrderTestCase
...
OdiScenarioVariableTestCase
SequenceAndTransactionTestCase
KMMappingTestCase
OdiSessionStepLogTestCase
InteractiveInterfaceHelperMixedCaseCrossRefTestCase
OdiVariableTestCase
OdiSessionBlueprintTestCase

*FIG. 6F*

DETERMINING TEST CASES TO BE RUN UPON CHANGES IN SOFTWARE APPLICATION CODE

BACKGROUND OF THE DISCLOSURE

Technical Field

The present disclosure relates to software testing, and more specifically to determining test cases to be run upon changes in software application code.

Related Art

Software application code refers to a set of instructions, which are together compiled, linked, etc., as is well known in the relevant arts. The code of a software application is designed to implement one or more functionalities sought to be provided by the software application in accordance with the corresponding requirements.

Test cases are commonly run to check the operation and functionality of a software application code. Each test case specifies a testing procedure to make operative desired portion(s) of the code, the inputs to be provided for execution of the code, and the expected results of execution. The expected results are checked against the actual results/output resulting from the execution, with non-match generally indicating errors in the code.

There are often changes made to the software application code, with a view to meeting specific objectives. For example, during the development phase of the software application, developers may modify the code/instructions to add/modify/remove functionality, and during maintenance phase, developers may modify the code/instructions to fix errors/bugs found after deployment of the software application.

It is often required to determine the test cases to be run after such changes, typically to check whether the changes meet the specific objectives (change in functionality, fixing of bugs, etc.), as well as do not cause unintended consequences (e.g., create new errors, disrupting pre-existing functionality, etc.) in the operation of the software application.

Aspects of the present disclosure are directed to determining test cases to be run upon changes in software application code.

BRIEF DESCRIPTION OF THE DRAWINGS

Example embodiments of the present disclosure will be described with reference to the accompanying drawings briefly described below.

FIGS. 5A-5F and 6A-6F together illustrate an exemplary embodiment of determining test cases to be run upon changes in software application code.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
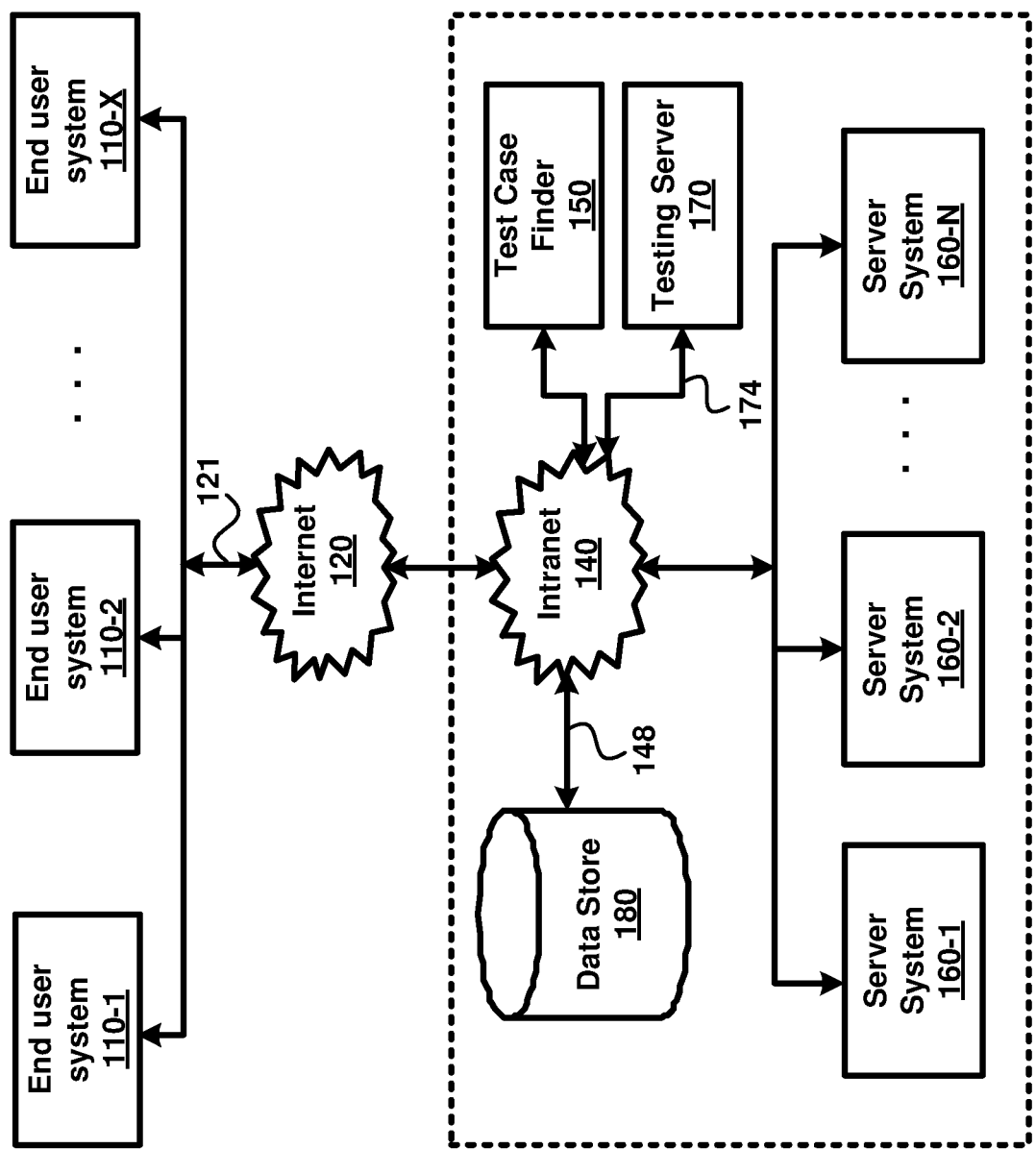
FIG. 1 is a block diagram illustrating an example environment in which several aspects of the present disclosure can be implemented.

An aspect of the present disclosure facilitates determining test cases to be run upon changes in software application code. In one embodiment, a system receives a test suite containing multiple test cases designed to perform the testing of a software application, the software application containing one or more components. The system executes each test case to determine a corresponding sequence of components executed in the software application for the test case, and then stores a dependency data indicating for each test case the corresponding determined sequence of components. Upon determining that a first component has been changed, the system identifies a first set of test cases that cause execution of the first component by performing a reverse look-up in the dependency data. The system then includes the first set of test cases in the test cases to be run for re-testing said software application.

According to another aspect of the present disclosure, the system (noted above) finds a second set of components having a static dependency with the first component and then identifies a second set of test cases that cause execution of each component of the second set of components by performing a reverse look-up in the dependency data. The system adds the second set of test cases to the first set of test cases for re-testing of the software application. In one embodiment, the system checks whether the dependency data is stale and performs the above actions if the dependency data is determined to be stale. The dependency data is deemed to be stale if the dependency information (contained therein) may not be accurate/reliable, for example due to the possibility of changes in application code, or substantial time having elapsed since the dependency data has been previously determined.

According to one more aspect of the present disclosure, the system (noted above) receives from a user, input data indicating that a third set of components have been changed in addition to the first component. The system then identifies a third set of test cases that cause execution of each component of the third set of components by performing a reverse look-up in the dependency data. The system adds the third set of test cases to the first set of test cases for re-testing of the software application. In one embodiment, the determination of the changed component is based on receiving from the user an indication that the first component has been changed as part of the input data.

According to yet another aspect of the present disclosure, the software application contains multiple classes, each class containing a corresponding set of methods. Each component is a corresponding method of a corresponding class, the first component being a first method of a first class. The sequence of components for a test case is a sequence of methods invoked upon execution of the test case.

According to an aspect of the present disclosure, the system (noted above) determines the sequence of components for a test case by first identifying a set of classes having dynamic dependency with the first class and then a set of methods in the set of classes dynamically invoked by the first method.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment in which several aspects of the present disclosure can be implemented. The block diagram is shown containing end-user systems 110-1 through 110-X (X representing any natural number), Internet 120, intranet 140, test case finder (TCF) 150, server systems 160-1 through 160-N (N representing any natural number), testing server 170 and data store 180. The end-user systems and server systems are collectively referred to by 110 and 160 respectively.

Merely for illustration, only representative number/type of systems are shown in FIG. 1. Many environments often contain many more systems, both in number and type, depending on the purpose for which the environment is designed. Each block of FIG. 1 is described below in further detail.

Intranet 140 provides connectivity between various systems of an enterprise (as indicated by the dotted boundary) such as test case finder (TCF) 150, server systems 160-1 through 160-N (N representing any natural number), testing server 170 and data store 180 Internet 120 extends the connectivity of these (and other systems of the enterprise) with external systems such as end-user systems 110. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Each of end-user systems 110 represents a system such as a personal computer, workstation, mobile device, computing tablet etc., used by users to generate (user) requests directed to software applications executing in server systems 160. A user request refers to a specific technical request (for example, Universal Resource Locator (URL) call) sent to a server system from an external system (here, end-user system) over Internet 120, typically in response to a user interaction at end-user systems 110. The user requests may be generated by users using appropriate user interfaces (e.g., web pages provided by an application executing in a node, a native user interface provided by a portion of an application downloaded from a node, etc.).

In general, an end-user system requests a software application for performing desired tasks and receives the corresponding responses (e.g., web pages) containing the results of performance of the requested tasks. The web pages/responses may then be presented to a user by a client application such as the browser. Each user request is sent in the form of an IP packet directed to the desired system or software application, with the IP packet including data identifying the desired tasks in the payload portion.

Data store 180 represents a non-volatile (persistent) storage facilitating storage and retrieval of data by software applications executing in the other systems of the enterprise such as TCF 150, server systems 160 and testing server 170. Data store 180 may be implemented as a corresponding database server using relational database technologies and accordingly provide storage and retrieval of data using structured queries such as SQL (Structured Query Language). Alternatively, data store 180 may be implemented as a corresponding file server providing storage and retrieval of data in the form of files organized as one or more directories, as is well known in the relevant arts.

Each of server systems 160A-160N represents a server, such as a web/application server, constituted of appropriate hardware executing software applications (or components thereof) capable of performing tasks requested by end-user systems 110. Examples of such software applications include, but are not limited to, data processing (e.g., batch processing, stream processing, extract-transform-load (ETL)) applications, Internet of things (IoT) services, mobile applications, and web applications.

In general, a server system receives a user request from an end-user system and performs the tasks requested in the user request. A server system may use data stored internally (for example, in a non-volatile storage/hard disk within the server system), external data (e.g., maintained in a data store) and/or data received from external sources (e.g., received from a user) in performing the requested tasks. The server system then sends the result of performance of the tasks to the requesting end-user system (one of 110) as a corresponding response to the user request. The results may be accompanied by specific user interfaces (e.g., web pages) for displaying the results to a requesting user.

Testing server 170 facilitates the testing of the software applications (and components thereof) deployed and executing in server systems 160. In one embodiment, testing server 170 receives a test suite containing multiple (typically, a large number of) test cases to be used for testing the functionalities and/or specific requirements associated with a software application. Testing server 170 then runs each test case of the test suite and determines whether the test case has passed (indicating successful implementation of the functionality/requirement) or failed (indicating errors). Running of a test case entail executing the components of the software application specified in the test case, capturing the actual output/results of execution, comparing the actual output to the expected output specified in the test case and determining that the test case has passed upon the actual output matching the expected output or failed otherwise.

As noted in the Background section, the software application code forming the software application (or components thereof) deployed in server systems 160 may be changed/modified. Such changes/modifications typically require the software application to be re-tested. In a known approach, testing server 170 performs the re-testing of the software application (commonly referred to as "regression testing") by running all the test cases in the test suite. However, such an approach necessitates running of a large number of test cases for every change made to the software application. It may be accordingly desirable that an optimal set of test cases be identified and run to perform the re-testing of the software application.

Test case finder (TCF) 150, provided according to several aspects of the present disclosure, determines test cases to be run upon changes in software application code as described below with examples.

Figure 2:
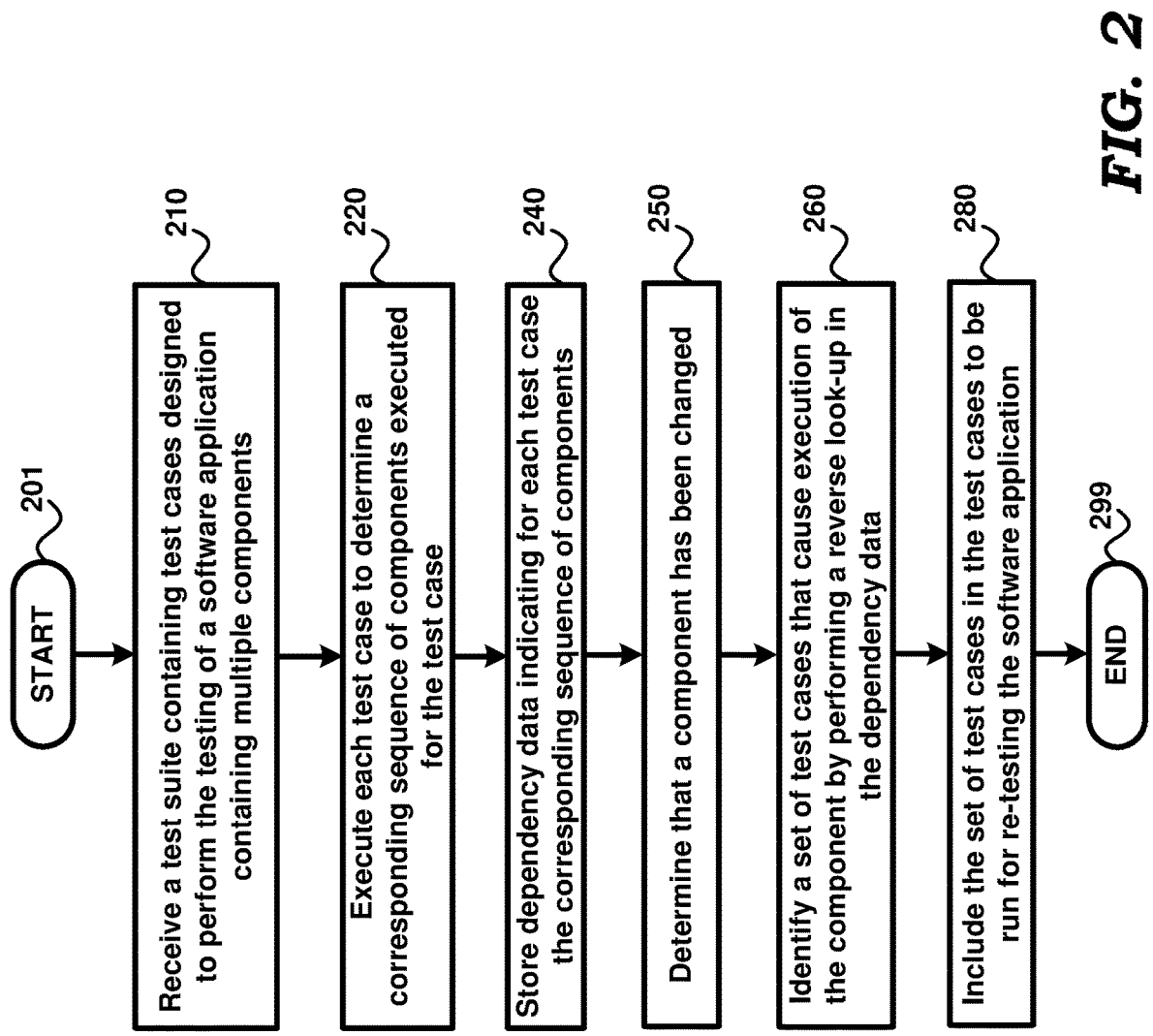
FIG. 2 is a flow chart illustrating the manner in which test cases to be run upon changes in software application code are determined according to several aspects of the present disclosure.

3. Determining Test Cases to be Run Upon Changes in Software Application Code FIG. 2 is a flow chart illustrating the manner in which test cases to be run upon changes in software application code are determined according to several aspects of the present disclosure. The flowchart is described with respect to the systems of FIG. 1, in particular TCF 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, TCF 150 receives a test suite containing test cases designed to perform the testing of a software application containing multiple components. The software application and components thereof may be deployed in server systems 160. The test suite may be received from one of end-user systems 110. Alternatively, multiple test suites may be stored in data store 180 and an identifier indicating the test suite to be used may be received from one of end-user systems 110.

In step 220, TCF 150 executes each test case to determine a corresponding sequence of components executed for the test case. It should be noted that the execution of a test case (in contrast to running a test cases) merely requires the executing of the components of the software application specified in the test case and does not require the subsequent actions of capturing, comparing and determining to be performed.

It may be appreciated that the execution of the components specified in the test case may invoke (and thereby cause execution of) other components, with the execution of each of the other components in turn causing invocation of execution of additional components, etc. Thus, the execution of a test case may cause the execution of a corresponding sequence of components (e.g., specified component, other component, additional component) of the software application.

In step 240, TCF 150 stores dependency data indicating for each test case (of the received test suite) the corresponding sequence of components executed for the test case. The dependency data may be stored in any convenient format, either in a volatile/non-volatile storage internal to TCF 150 or in an external non-volatile storage such as data store 180.

It may be appreciated that the dependency data indicates the dynamic dependencies between the test cases and components in view of the dependency being determined based on actual execution of the test cases/components. In contrast, static dependencies are determined based on the inspection of test case code/software application code. For example, when the software code of a component includes a code line that invokes another component, the two components are deemed to have a static dependency.

In step 260, TCF 150 determines that a component (of the software application) has been changed. In one embodiment, the determination is performed by receiving from a user an input data indicating that the component has changed. Alternatively, the determination may be performed by monitoring one of more files containing the software application code and then determine, based on the monitoring, that a file (corresponding to the component) has been changed (added/deleted/modified).

In step 270, TCF 150 identifies a set of test cases that cause execution of the (changed) component by performing a reverse look-up in the dependency data. The identification may be performed by searching for (an identifier of) the changed component in the sequence of components stored as part of the dependency data. For each sequence found to contain the changed component, the corresponding test case to which the sequence is associated is include in the set. The term "reverse look-up" implies that the components are used to identify the test cases in contrast to a normal look-up where a test case may be used to identify the corresponding components.

In step 280, TCF 150 includes the identified set of test cases in the test cases to be run for re-testing the software application. The inclusion may be performed by marking the identified set of test cases as required to be run in the received test suite. Alternatively, the identified set of test cases may be displayed to a user using one of end-user systems 110.

Such inclusion ensures that the identified set of test cases are run by testing server 170 when performing the re-testing of the software application. In one embodiment, testing server 170 runs only the identified set of test cases, thereby ensuring that only an optimal set of test cases are run to perform the re-testing of the software application. Control passes to step 299, where the flowchart ends.

Thus, TCF 150 determines an optimal set of test cases to be run upon changes in software application code. According to an aspect, at step 270, TCF 150 also finds a second set of components having a static dependency with the changed component and then identifies a second set of test cases that cause execution of each component of the second set of components by performing a reverse look-up in the dependency data. The system adds the second set of test cases (along with the set of test cases identified in step 270) to the test cases to be run for re-testing the software application.

According to another aspect, TCF 150 receives from a user, input data indicating that a third set of components have been changed in addition to the changed component determined in step 260. TCF 150 then identifies a third set of test cases that cause execution of each component of the third set of components by performing a reverse look-up in the dependency data and adds the third set of test cases (along with the set of test cases identified in step 270) to the test cases to be run for re-testing the software application.

It should be appreciated that the above noted second and third sets of test cases are determined without requiring the entire dependency data to be re-determined. The addition of these test cases ensures that test cases possibly missed (not identified in step 270), for example, due to the dependency data being stale, are also now included. While the inclusion of the second and third sets of test cases may not make optimal the set of test cases run, it should be noted that the number of test cases run is still less than total number of test cases in the test suite (which would have to be run otherwise).

The manner in which TCF 150 provides several aspects of the present disclosure according to the steps of FIG. 2 is illustrated below with examples.

4. Illustrative Example

FIGS. 3, 4A-4B, 5A-5F, and 6A-6C illustrate the manner in which TCF 150 determines test cases to be run upon changes in software application code in one embodiment. Each of the Figures is described in detail below.

Figure 3:
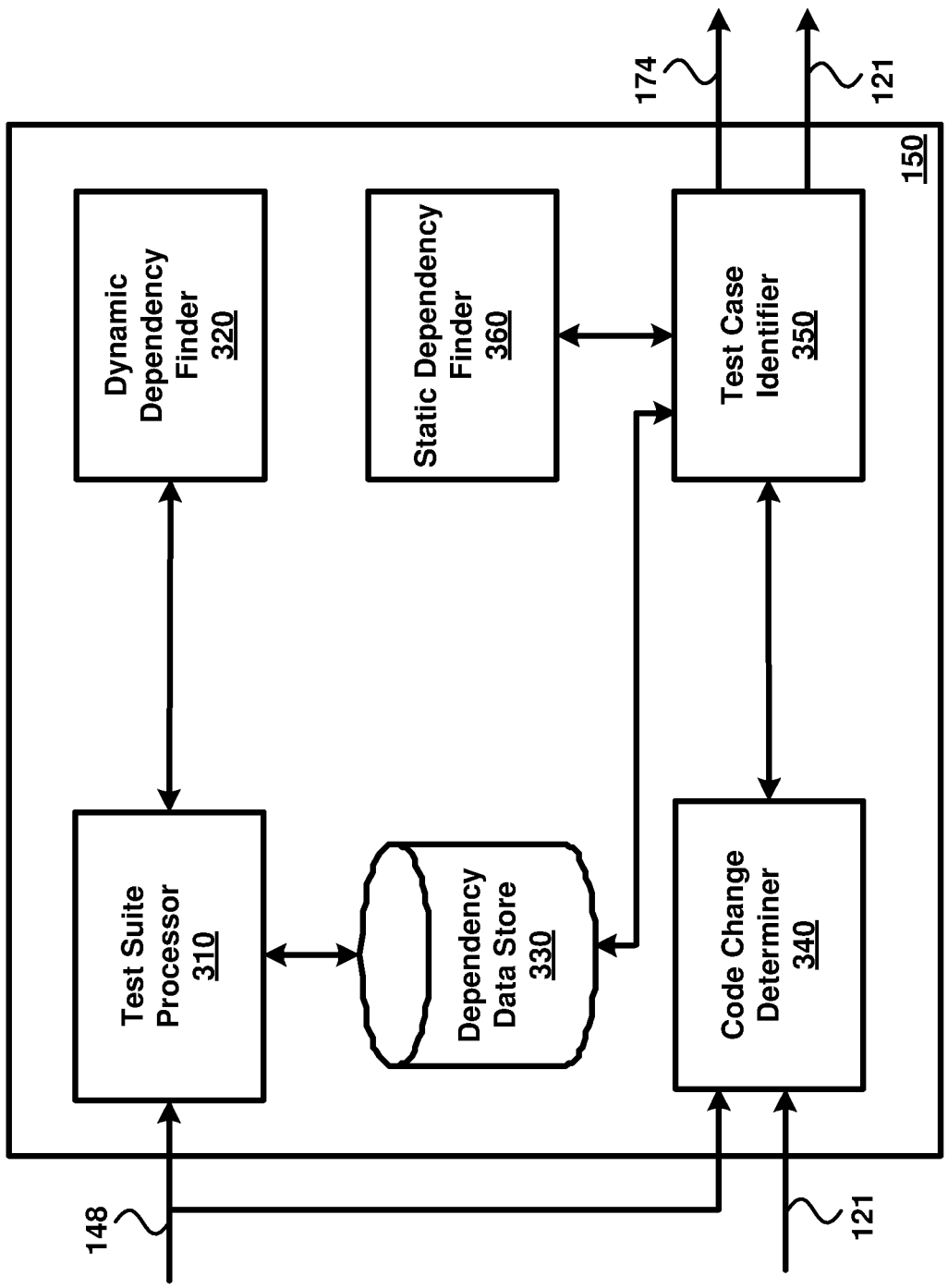
FIG. 3 is a block diagram illustrating an implementation of a test case finder in one embodiment.

FIG. 3 is a block diagram illustrating an implementation of a test case finder (150) in one embodiment. The block diagram is shown containing test suite processor 310, dynamic dependency finder 320, dependency data store 330, code change determiner 340, test case identifier 350 and static dependency finder 360. Each of the blocks is described in detail below.

Test suite processor 310 receives (via path 121) a test suite from one of end-user systems 110. Alternatively, test suite processor 310 retrieves (via path 148) a test suite from data store 180 based on an identifier of the test suite received from one of end-user systems 110. After obtaining the test suite, test suite processor 310 forwards each of the test cases in the test suite to dynamic dependency finder 320 and receives the dynamic dependencies of the forwarded test case, that is, the sequence of components of a software application that are executed for the forwarded test case. Test suite processor 310 then stores the test cases associated with the corresponding sequences of components in dependency data store 330.

Dynamic dependency finder 320 receives a test case from test suite processor 310 and causes execution of the received test case. As noted above, execution of the test case merely entails execution of the components of the software application specified in the received test case. In one embodiment, dynamic dependency finder 320 instruments the software application code to find the sequence of components executed for the received test case. After finding the sequence of components for the received test case, dynamic dependency finder 320 forwards the sequence of components to test suite processor 310.

Dependency data store 330 represents a data store (similar to data store 180) that maintains the dependency data in a convenient format. For example, when dependency data store 330 is implemented as database server, the dependency data is stored as a table. In one embodiment, the dependency data is maintained as a mapping from each test case in a test suite to the corresponding sequence of components. It may be appreciated that the dependency data 330 may be determined and stored in dependency data store 330 a priori before performing the determination of changes made to the software application described below.

Code change determiner 340 determines whether any changes have been made to the software application code. In one embodiment, code change determiner 340 receives (via path 121) an input data indicating the set of files/components changed in the software application from a user (such as a developer, tester, administrator, etc.) using one of end-user systems 110. Alternatively, though not shown, code change determiner 340 may monitor the attributes (such as last modified date) of one of more files containing the software application code stored in server systems 160, and then determine the specific component that has been changed based on such monitoring. After determining the specific components of the software application that have been changed, code change determiner 340 forwards the details (such as the file name, component name, etc.) of the changed components to test case identifier 350.

Test case identifier 350 identifies a set of test cases that cause execution of the (changed) components by performing a reverse look-up in the dependency data maintained in dependency data store 330. Test case identifier 350 then sends (via path 174) the identifiers of the identified set of test cases testing server 170, which in turn runs the identified set of test cases and perform the re-testing of the software application. Alternatively, or in addition, test case identifier 350 provides/displays (via path 121) the identified set of test cases to a user using one of end-user systems 110.

According to an aspect, test case identifier 350 also forwards the changed component to static dependency finder 360, and receives in response, a second set of components having a static dependency with the changed component. Test case identifier 350 then identifies a second set of test cases that cause execution of each component of the second set of components by performing a reverse look-up in the dependency data maintained in dependency data store 330. Test case identifier 350 adds the second set of test cases to the set of test cases identified earlier before sending to testing server 170 or displaying to a user.

Static dependency finder 360 receives a changed component from test case identifier 350 and finds the static dependencies of the received changed component. In one embodiment, static dependency finder 360 inspects the software code of the changed component to determine the code lines that invoke other components of the software application. The determined other components are deemed to have static dependency with the changed component. Static dependency finder 360 then sends the determined other components as a response to test case identifier 350.

It may be appreciated that in alternative embodiments, test case identifier 350 checks whether the dependency data (stored in in dependency data store 330) is stale, for example, if the dependency data is much older (greater than a pre-defined threshold) or if the number of changes made to the software application is large. Test case identifier 350 then uses static dependency finder 360 only when the dependency data is determined to be stale.

According to another aspect, test case finder 350 receives from code change determiner 340, a third set of components have been changed in the software application in addition to the determined changed component. Test case identifier 350 then identifies a third set of test cases that cause execution of each component of the third set of components by performing a reverse look-up in the dependency data maintained in dependency data store 330. Test case identifier 350 adds the third set of test cases to the set of test cases before sending to testing server 170 or displaying to a user.

The manner in which the various blocks of TCF 150 noted in FIG. 3 operate together for determining test cases to be run upon changes in software application code is described below with examples.

5. Sample Operation

Figure 4A:
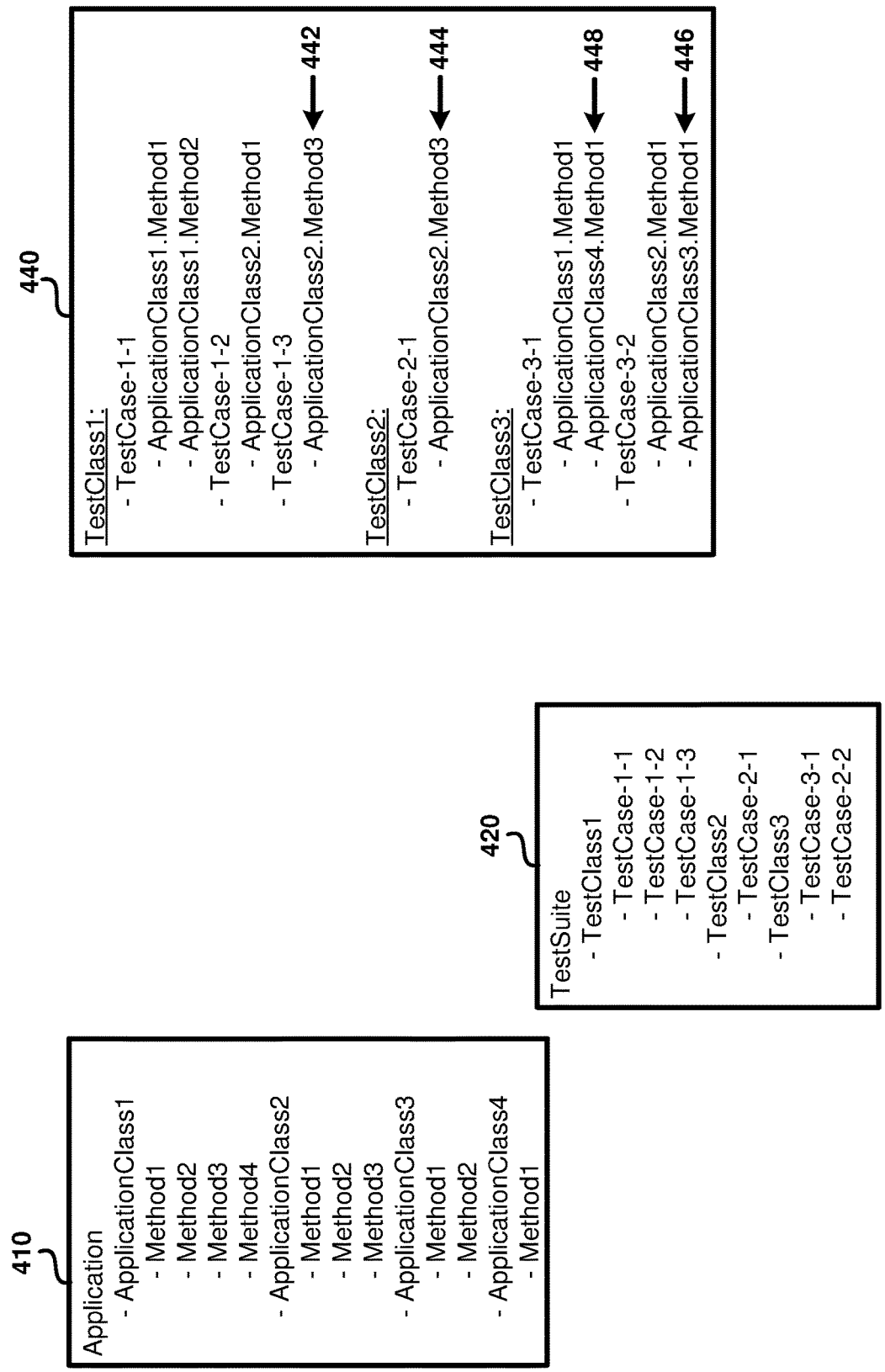
FIGS. 4A-4B together illustrate the manner in which test cases to be run upon changes in software application code are determined in one embodiment.
Figure 4B:
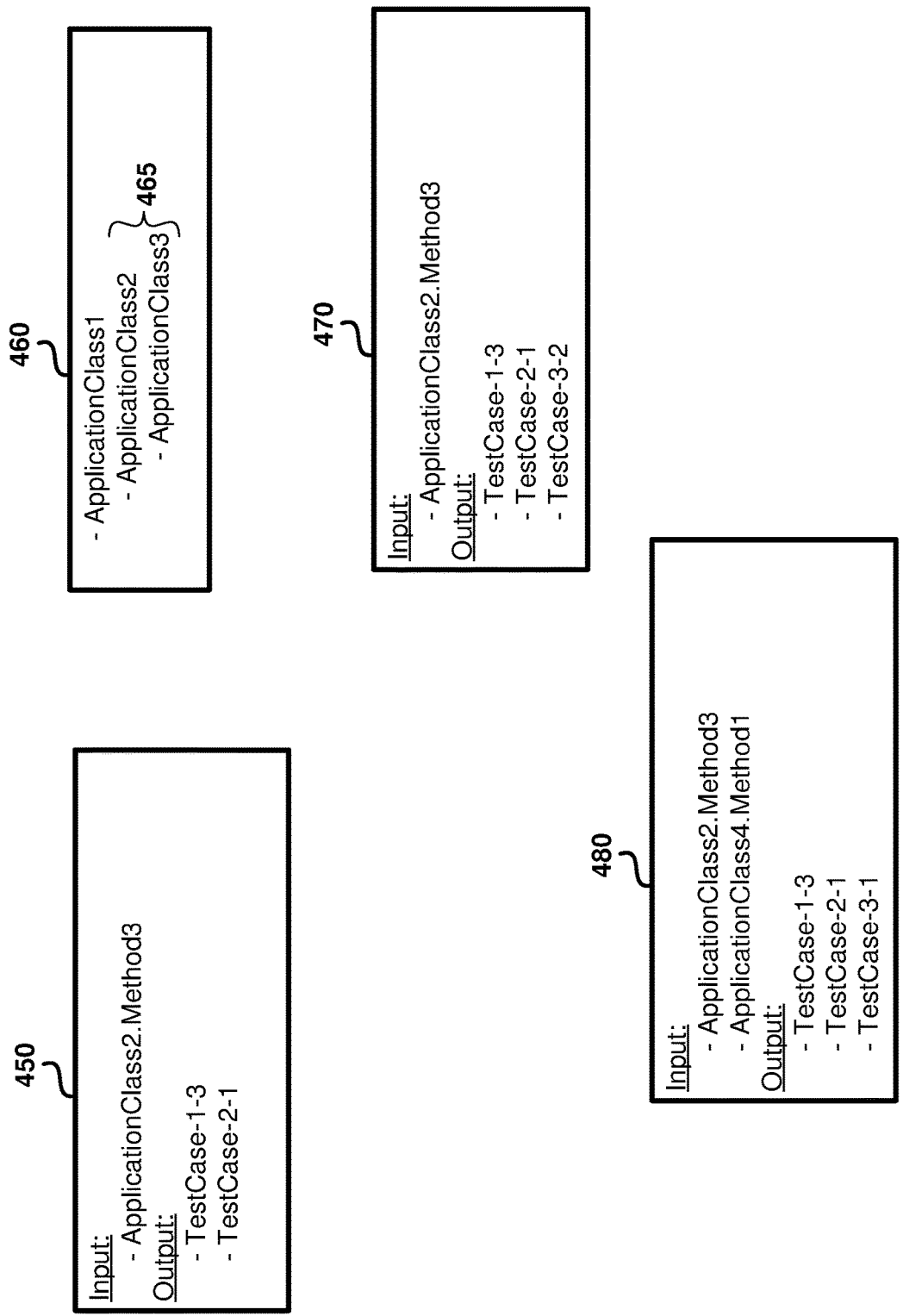

FIGS. 4A-4B together illustrate the manner in which test cases to be run upon changes in software application code are determined in one embodiment. The following disclosure is provided with respect to a software application containing classes and method defined as per object-oriented programming (OOP) paradigm. However, the features of the presented disclosure may be implemented for other software applications employing other paradigms (such as modular programming paradigm which has modules and procedures) as well, as will be apparent to one skilled in the relevant arts by reading the disclosure herein.

An example software application is shown in 410. Specifically, software application 410 is shown containing multiple classes (e.g., ApplicationClass1, ApplicationClass2, etc.), with each class shown containing a corresponding set of methods (e.g., Method1, Method2, etc.). In one embodiment, each component is a corresponding method of a corresponding class.

An example test suite is shown in 420. Specifically, test suite 420 is shown containing one or more test classes (e.g., TestClass1, TestClass2, etc.), with each test class shown containing a respective set of test cases (e.g., TestCase-1-1, TestCase-1-2, TestCase-2-1, etc.). Upon receipt of test suite 420, test suite processor 310 determines a dependency data using dynamic dependency finder 310 and stores the determined dependency data in dependency data store 330.

A portion of the dependency data determined for the test cases in test suite 420 is shown in 420. It may be observed that the sequence of components for each test case is a sequence of methods invoked upon execution of the test case. For example, the test case TestCase-1-1 is shown associated with the corresponding sequence of components/methods [ApplicationClass1.Method1, ApplicationClass1.Method2] executed for that test case.

According to an aspect of the present disclosure, test suite processor 310 determines the sequence of components for a test case by first identifying a set of classes having dynamic dependency with the first class and then a set of methods in the set of classes dynamically invoked by the first method.

An input and output of TCF 150 is shown in 450. Specifically, the input of 450 indicates the changed component (here, ApplicationClass2.Method3) determined by code change determiner 340, while the output of 450 indicates the set of test cases identified by test case identifier 350 by performing a reverse look-up of the changed component against the dependency data of data portion 440. It may be observed that the reverse look-up results in the identifications of data portions 442 and 444 in data portion 440, and accordingly, the output of 450 is shown containing the set {TestCase-1-3, TestCase-2-1}. The output of 450 may then be included in the test cases to be run for re-testing software application 410.

According to an aspect, test case identifier 350 also identifies a second set of test cases to be added to the previous identified set based on the static dependencies determined by static dependency finder 360.

The static dependencies among the various classes of software application 410 is shown in 460. Static dependencies 460 may be generated by inspecting the software application code. Static dependency finder 360 inspects the data of 460 to identify the set of classes having static dependency with the class of the changed component, that is ApplicationClass2. Data portion 465 indicates that ApplicationClass2 has a static dependency with ApplicationClass3. Test case identifier 350 then performs a reverse look-up for the identified static dependency classes, and according identifies data portion 446 in the dependency data of data portion 440.

Another input and output of TCF 150 is shown in 470. The input of 470, ApplicationClass2.Method3, is the same as the input shown in 450. However, it may be observed that the output of 470 is the set {TestCase-1-3, TestCase-2-1, TestCase-3-2} which includes the test cases (here, TestCase-3-2) identified based on the static dependency classes of the input class ApplicationClass2. The output of 470 may then be included in the test cases to be run for re-testing software application 410.

The scenario when an input data indicating other changed components of the software application is received from a user is shown in 480. The input of 480 indicates that in addition to ApplicationClass2.Method3 (the input of 450), the component ApplicationClass4.Method1 has also been changed. The output of 480 is the set {TestCase-1-3, TestCase-2-1, TestCase-3-1} which includes the test cases (here, TestCase-3-1) identified based on a reverse look-up of the dependency data (data portion 448) corresponding to the input class ApplicationClass4.Method1. The output of 480 may then be included in the test cases to be run for re-testing software application 410.

Thus, TCF 150 determines the test cases to be run upon changes in software application code according to several aspects of the present disclosure. The manner in which the various blocks of TCF 150 noted in FIG. 3 may be implemented and the corresponding operation described above with respect to FIGS. 4A-4B may be performed is described in detail below.

6. Exemplary Embodiment

FIGS. 5A-5F and 6A-6F together illustrate an exemplary embodiment of determining test cases to be run upon changes in software application code. The embodiment described below uses Java™ technologies, well known in the art. For example, the software application and test suite are implemented as classes and methods using Java™ programming language. Accordingly, the component is a method of a Java™ class.

Figure 5A:
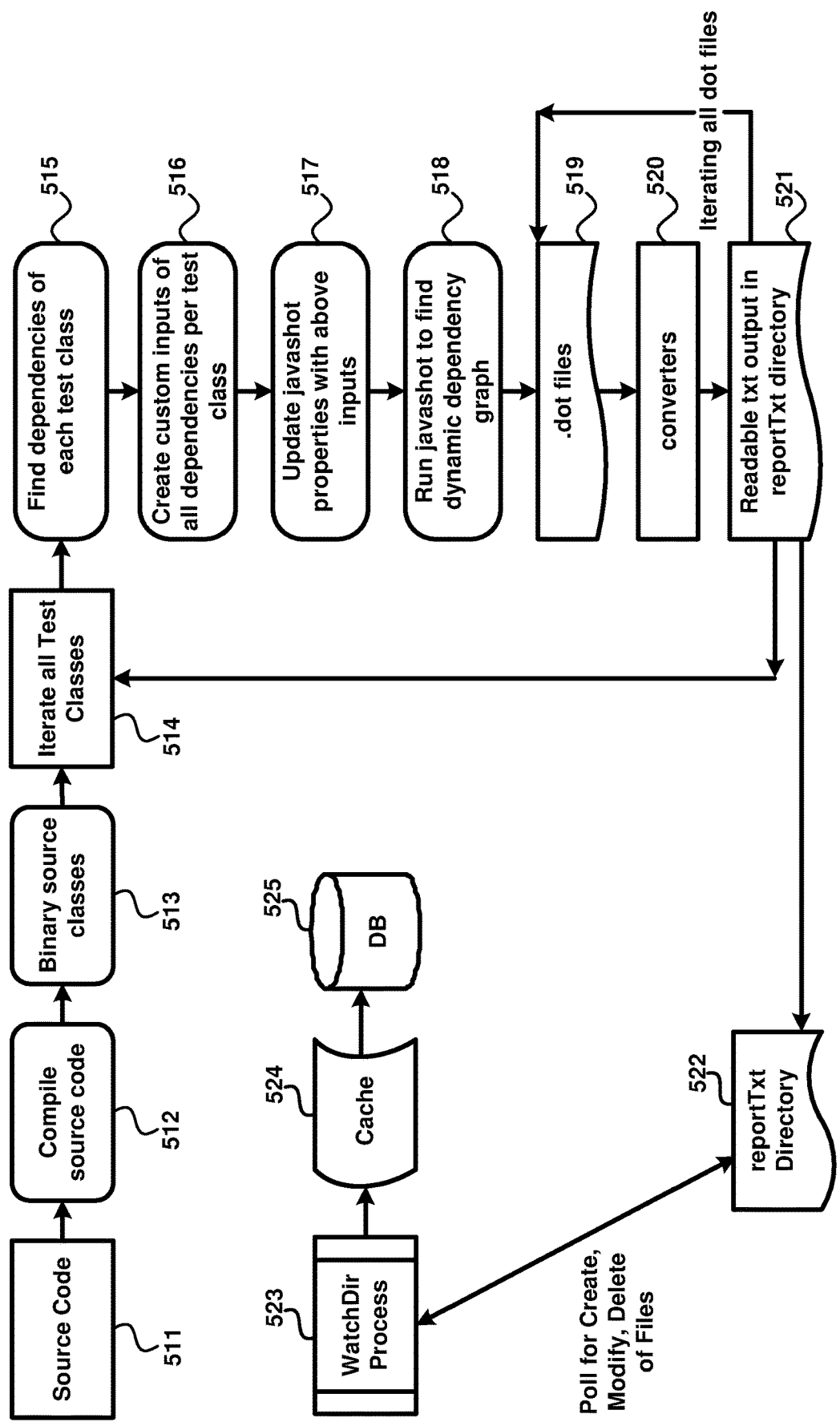

FIG. 5A is a flow chart illustrating the manner in which test cases of a test suite are processed to determine dependency data in one embodiment. Source code 511 of a software application is compiled/linked (in step 512) to generate binary source classes 513 which are then provided to test case processor 310. Test case processor 310 also receives an identifier of a test suite containing one or more test classes and determines the dependent classes of the software application that are executed by each test class in the test suite. In step 514, test case processor 310 iterates over all the test classes in the received test suite. For each test class, test case processor 310 first determines the dependencies (classes) of each test class in step 515. Sample dependent classes determined by test case processor 310 for the test case/class "ImportScenTestCase" is shown in FIG. 5B.

The next step is to determine the other classes and methods executed by the dependent classes using the dynamic dependency finder 320. It may be appreciated that as execution flows might change depending on parameters being passed to a method, and accordingly the class & method to test case mapping needs to be extracted from runtime stack.

Dynamic dependency finder 320 is implemented using javashot API available from Google™. As is well known, the javashot API uses Java instrumentation capabilities to capture the dynamic execution flow of a Java program. The javashot API takes as input a ClassPattern (specified in a properties file) indicating the set of classes to be inspected and generates as output a set of dot files (".dot" file extension) that can be visualized as corresponding graphs using the appropriated tools.

In one embodiment, dynamic dependency finder 320 dynamically forms the class patterns based on the dependent classes determined for the test classes (as shown in FIG. 5B). Accordingly, in step 516, dynamic dependency finder 320 creates custom input(s) of all dependencies per test class. In step 517, dynamic dependency finder 320 updates the javashot properties file with the input(s) created in step 516 and then runs javashot API to find the dynamic dependency graph for each test class in step 518. It should be noted that dynamic dependency finder 320 invokes the javashot API iteratively while passing as input a subset of the class patterns during each iteration. The input for one such iteration is shown in FIG. 5C.

Figure 5D:
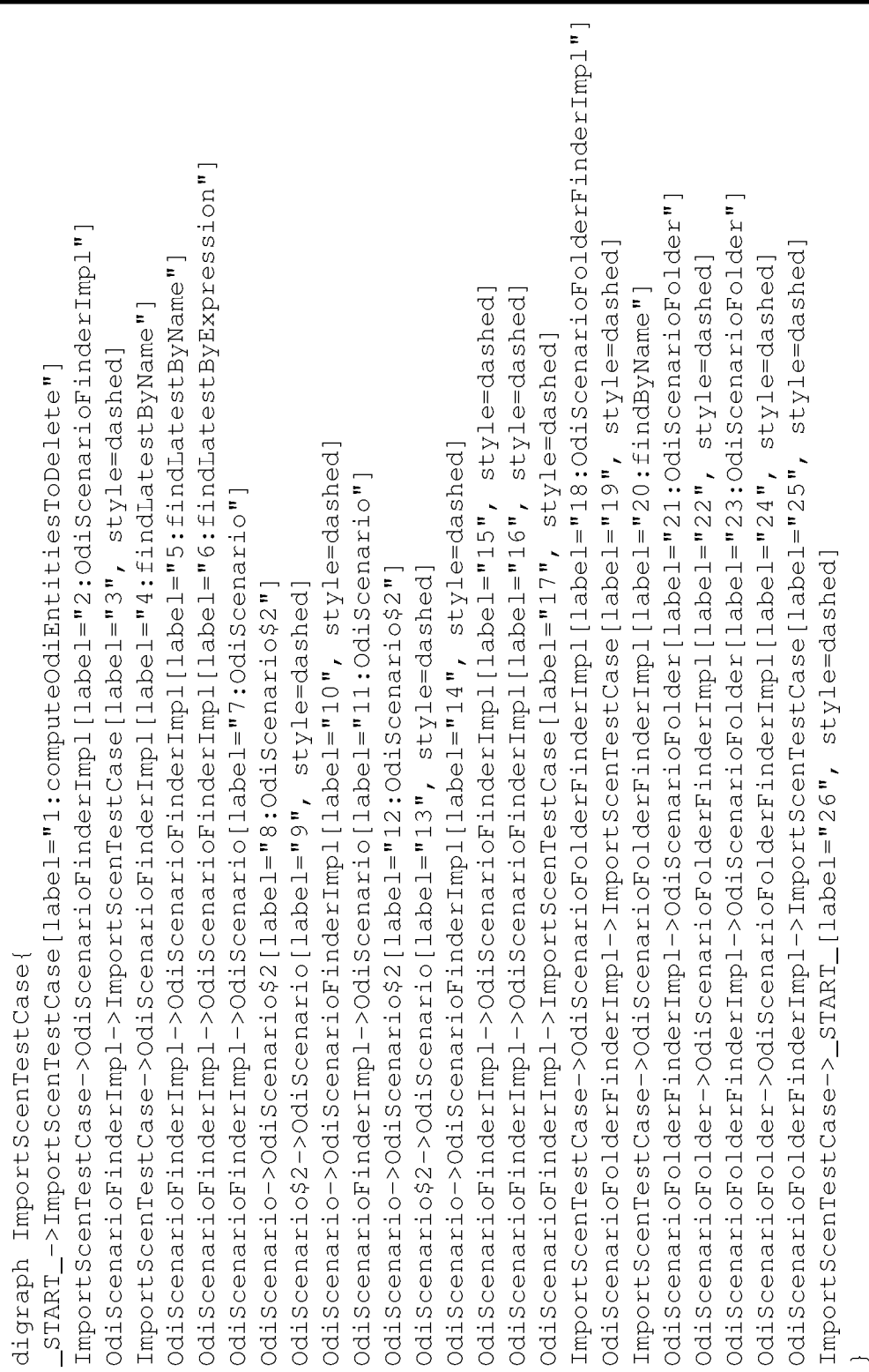

The result of performing the iterations is a set of dot files (519) containing the dependencies of the test case "ImportScenTestCase". An example sequence of components/method between the test class "ImportScenTestCase" and a component "OdiScenarioFolder" is shown in FIG. 5D.

In one embodiment, dynamic dependency finder 320 converts (using converters 520) the dot files generated by javashot to a readable text format such as a set of text files 521 and stored them in a "reportTxt" directory 522. An example sequence of components/methods in the readable format between the test class "ImportScenTestCase" and a component "OdiScenarioFolder" is shown in FIG. 5E. Only a portion of the sequence is shown in FIG. 5E for illustration. It may be appreciated that the complete sequence of components/method of 5D would be converted to the readable text format.

WatchDir (watch directory) process 523 is a background process (implemented as part of dynamic dependency finder 320) that keeps polling the "reportTxt" directory 522 to check whether any filed in the directory has been created/modified/deleted. Upon detecting that new text files have been created in directory 522, WatchDir process 523 reads and parses the text files to extract the DependentClass and DependentMethod for the test case/class ImportScenTestCase. The extracted information is stored in cache 524, implemented as part of test suite processor 310.

After the processing of each test case, the test case and associated dependent classes and methods (sequence of component) is stored as part of dependency data in DB (database) 525, which is a database in dependency data store 330. A sample portion of dependency data stored in dependency data store 330 corresponding to the test case/class "ImportScenTestCase" is shown in FIG. 5F. It should be noted that the order of the components in the sequence is not relevant to providing various aspects of the present disclosure. Similarly, other portions of the dependency data indicating the sequence of components for other test cases/classes is also determined and stored in dependency data store 330.

Figure 6A:
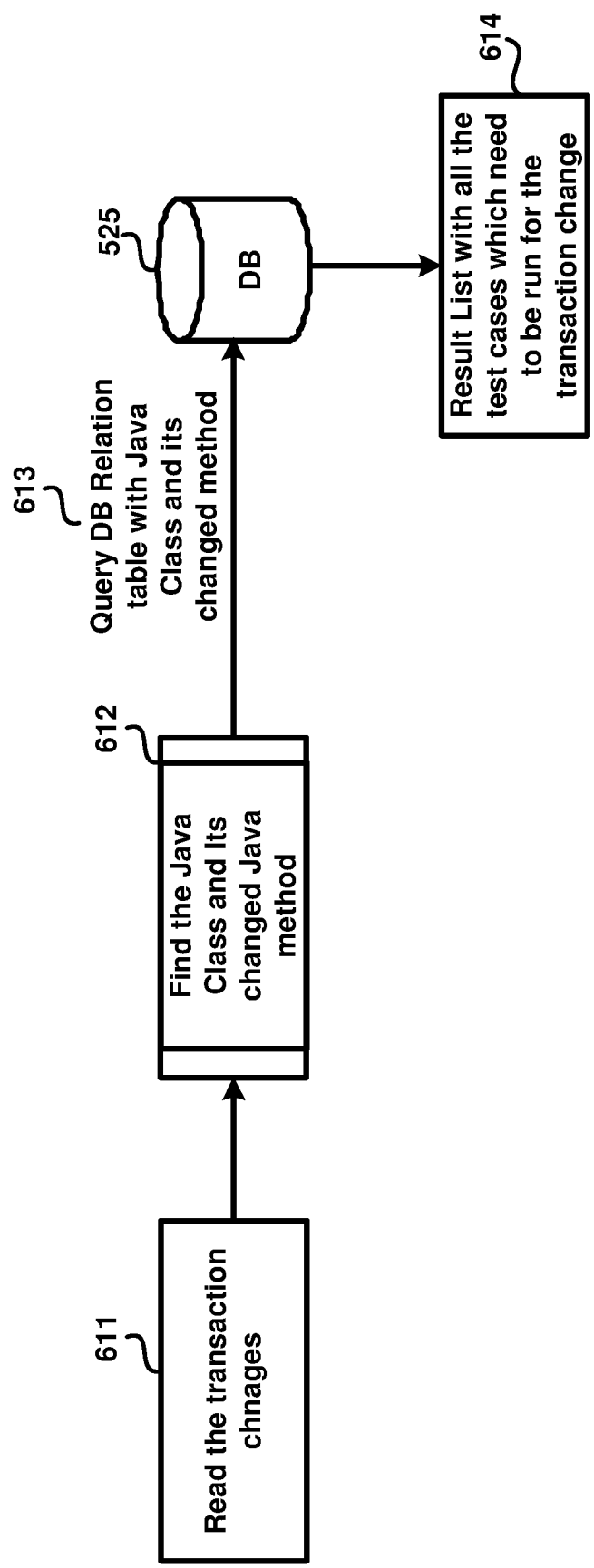

FIG. 6A is a flow chart illustrating the manner in which dependency data is used to determine test cases to be run upon changes in software application code in one embodiment. In step 611, code change determiner 340 reads the changes to the software application code specified in a transaction received (as input data) from a user. The transaction may be received from one of end-user systems 110. An example transaction that may be received from the user is shown in FIG. 6B.

In step 612, code change determiner 340 parses the transaction (and the software application code) to find the Java class and the corresponding changed Java method (the changed component) as shown in FIG. 6C, and forwards the details of the changed component to test case identifier 340.

In step 613, test case identifier 340 queries the DB (database) relation table storing the dependency data (of FIG. 5F) with the Java class and the corresponding changed method. The query is directed to DB 525, the database storing the dependency data of FIG. 5F. In step 614, based on the query, test case identifier 340 identifies the result list with all the test cases which need to be run for the transaction change. Thus, test case identifier 340 performs a reverse look-up of the changed component against the dependency data stored in dependent data store 330. An output of the reverse look-up for the changed component of FIG. 6C is shown in FIG. 6D. From the output, it may be appreciated that test case "Bug21251801TestCase" has to be run for re-testing the software application in view of the change made to the "SnpMapping" class of the software application.

As noted above, test case identifier 340 may determine that the dependency data is stale, and accordingly may include the test cases corresponding to the static dependencies of the changed component. In one embodiment, static dependency finder 360 is implemented using the jdeps tool available from Java™. As is well known, the jdeps tool provides the package-level or class-level dependencies of Java class files. The jdeps tool is run with the changed component class as the input (here "SnpMapping"), and the output parsed to determine the static dependencies of the changed component. The static dependency classes of a changed component class ("SnpMapping") determined based on the output of jdeps tool is shown in FIG. 6E.

Test case identifier 340 receives the static dependency classes from static dependency finder 360 and performs a reverse look-up of each dependent class against the dependency data stored in dependency data store 330. A sample set of test cases identified based on the reverse look-up of the dependent classes of FIG. 6E is shown in FIG. 6F. A union of the identified test cases shown in FIGS. 6D and 6F may then be run for re-testing the software application.

Thus, TCF 150 identifies (and corresponding causes to run) only a subset of all test cases which are actually related to the code change. TCF 150 accordingly avoids the process of running the full set of test cases in the test suite and reduces the entire time of code checkin process. In addition, TCF 150 also facilitates users to determine the code coverage of the test suite for the software application. For example, the number of identified set of test cases for a changed component being 0 is indicative of a lack of test cases in the test suite that are designed to test the changed component.

It should be further appreciated that the features described above can be implemented in various embodiments as a desired combination of one or more of hardware, software, and firmware. The description is continued with respect to an embodiment in which various features are operative when the software instructions described above are executed.

7. Digital Processing System

Figure 7:
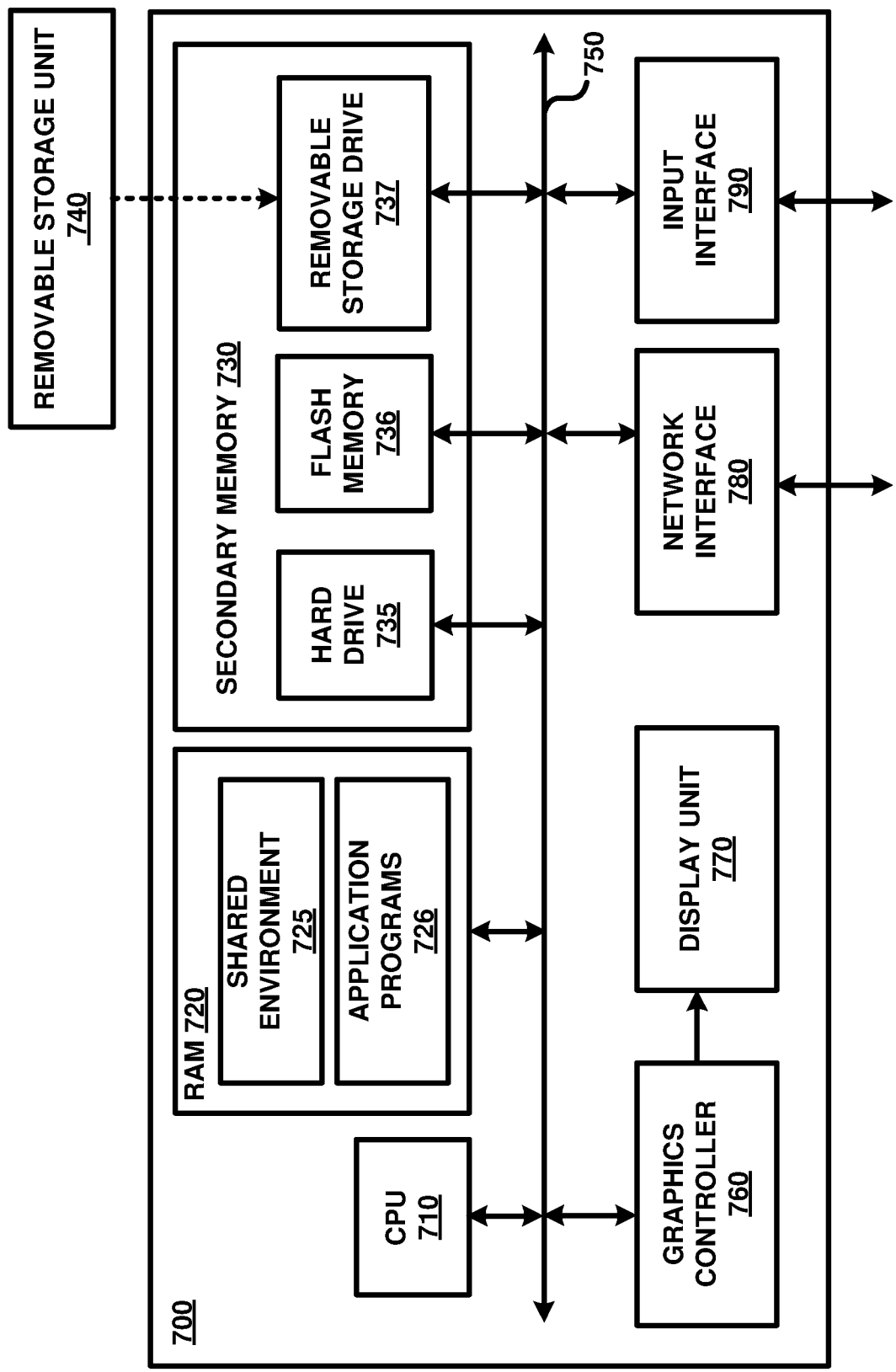
FIG. 7 is a block diagram illustrating the details of a digital processing system in which various aspects of the present disclosure are operative by execution of appropriate executable modules.

FIG. 7 is a block diagram illustrating the details of digital processing system (800) in which various aspects of the present disclosure are operative by execution of appropriate executable modules. Digital processing system 700 may correspond to Test case finder (TCF) 150 or any system implementing TCF 150.

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or other user programs 726 (such as other applications, DBMS, etc.). In addition to shared environment 725, RAM 720 may contain other software programs such as device drivers, virtual machines, etc., which provide a (common) run time environment for execution of other/user programs.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems connected to the networks.

Secondary memory 730 may contain hard drive 735, flash memory 736, and removable storage drive 737. Secondary memory 730 may store the data (e.g., data portions of FIGS. 4A-4B, 5A-5E and 6A-6E) and software instructions (e.g., for implementing the steps of FIG. 2, the blocks of FIG. 3), which enable digital processing system 700 to provide several features in accordance with the present disclosure. The code/instructions stored in secondary memory 730 may either be copied to RAM 720 prior to execution by CPU 710 for higher execution speeds, or may be directly executed by CPU 710.

Some or all of the data and instructions may be provided on removable storage unit 740, and the data and instructions may be read and provided by removable storage drive 737 to CPU 710. Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1050. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

8. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A computer-implemented method for determining test cases to be run upon changes in software application code, the method comprising:
   receiving a test suite containing a plurality of test cases designed to perform the testing of a software application, said software application containing a plurality of components;

executing each test case of said plurality of test cases to determine a corresponding sequence of components of said plurality of components executed for the test case;

storing a dependency data indicating for each test case, the corresponding sequence of components executed for the test case;

determining that a first component of said plurality of components has been changed;

identifying a first set of test cases that cause execution of said first component by performing a reverse look-up in said dependency data;

checking whether said dependency data is stale, wherein said checking is based on one or both of whether said dependency data is older than a pre-defined threshold time and whether the number of changes made to said software application is larger than a pre-defined value;

if said dependency data is stale:

finding a second set of components having a static dependency with said first component, wherein a component is deemed to have said static dependency and is included in said second set of components if the software code constituting said first component includes a code line that references the component;

identifying a second set of test cases that cause execution of any component of said second set of components by performing a reverse look-up in said dependency data; and including said first set of test cases and said second set of test cases in the test cases to be run for re-testing said software application.

2. The method of claim 1, wherein said finding, said identifying and said including said second set of test cases, are performed only if said dependency data is determined to be stale, and are not performed otherwise such that said re-testing is performed only with said first set of test cases.

3. The method of claim 1, further comprising:

receiving from a user, input data indicating that a third set of components of said plurality of components have been changed in addition to said first component;

identifying a third set of test cases that cause execution of any component of said third set of components by performing a reverse look-up in said dependency data; and adding said third set of test cases to the test cases to be run for re-testing said software application.

4. The method of claim 3, wherein said determining comprises receiving from said user an indication that said first component has been changed as part of said input data.

5. The method of claim 1, wherein said software application contains a plurality of classes, each class containing a corresponding set of methods, wherein each component of said plurality of components is a corresponding method of a corresponding class, said first component being a first method of a first class, wherein the sequence of components for a test case of said plurality of test cases is a sequence of methods invoked upon execution of the test case.

6. The method of claim 5, wherein the determining the sequence of components for a test case comprises identifying first a set of classes having dynamic dependency with said first class and then a set of methods in the set of classes dynamically invoked by said first method.

7. A non-transitory machine-readable medium storing one or more sequences of instructions for determining test cases to be run upon changes in software application code, wherein execution of said one or more instructions by one or more processors contained in a digital processing system cause said digital processing system to perform the actions of:

receiving a test suite containing a plurality of test cases designed to perform the testing of a software application, said software application containing a plurality of components;

executing each test case of said plurality of test cases to determine a corresponding sequence of components of said plurality of components executed for the test case;

storing a dependency data indicating for each test case the corresponding sequence of components executed for the test case;

determining that a first component of said plurality of components has been changed;

identifying a first set of test cases that cause execution of said first component by performing a reverse look-up in said dependency data;

checking whether said dependency data is stale, wherein said checking is based on one or both of whether said dependency data is older than a pre-defined threshold time and whether the number of changes made to said software application is larger than a pre-defined value;

if said dependency data is stale:

finding a second set of components having a static dependency with said first component, wherein a component is deemed to have said static dependency and is included in said second set of components if the software code constituting said first component includes a code line that references the component;

identifying a second set of test cases that cause execution of any component of said second set of components by performing a reverse look-up in said dependency data; and including said first set of test cases and said second set of test cases in the test cases to be run for re-testing said software application.

8. The non-transitory machine-readable medium of claim 7, wherein said finding, said identifying and said including said second set of test cases, are performed only if said dependency data is determined to be stale, and are not performed otherwise such that said re-testing is performed only with said first set of test cases.

9. The non-transitory machine-readable medium of claim 7, further comprising one or more instructions for:

receiving from a user, input data indicating that a third set of components of said plurality of components have been changed in addition to said first component;

identifying a third set of test cases that cause execution of each component of said third set of components by performing a reverse look-up in said dependency data; and adding said third set of test cases to the test cases to be run for re-testing said software application.

10. The non-transitory machine-readable medium of claim 9, wherein said determining comprises receiving from said user an indication that said first component has been changed as part of said input data.

11. The non-transitory machine-readable medium of claim 7, wherein said software application contains a plurality of classes, each class containing a corresponding set of methods, wherein each component of said plurality of components is a corresponding method of a corresponding class, said first component being a first method of a first class, wherein the sequence of components for a test case of said plurality of test cases is a sequence of methods invoked upon execution of the test case.

12. The non-transitory machine-readable medium of claim 11, wherein the determining the sequence of components for a test case comprises identifying first a set of classes having dynamic dependency with said first class and then a set of methods in the set of classes dynamically invoked by said first method.

13. A digital processing system comprising:
   a random access memory (RAM) to store instructions for determining test cases to be run upon changes in software application code; and
   one or more processors to retrieve and execute the instructions, wherein execution of the instructions causes the digital processing system to perform the actions of:
   receiving a test suite containing a plurality of test cases designed to perform the testing of a software application, said software application containing a plurality of components;
   executing each test case of said plurality of test cases to determine a corresponding sequence of components of said plurality of components executed for the test case;
   storing a dependency data indicating for each test case the corresponding sequence of components executed for the test case;
   determining that a first component of said plurality of components has been changed;
   identifying a first set of test cases that cause execution of said first component by performing a reverse look-up in said dependency data;
   checking whether said dependency data is stale, wherein said checking is based on one or both of whether said dependency data is older than a pre-defined threshold time and whether the number of changes made to said software application is larger than a pre-defined value;
   if said dependency data is stale:
      finding a second set of components having a static dependency with said first component, wherein a component is deemed to have said static dependency and is included in said second set of components if the software code constituting said first component includes a code line that references the component;
      identifying a second set of test cases that cause execution of any component of said second set of components by performing a reverse look-up in said dependency data; and
      including said first set of test cases and said second set of test cases in the test cases to be run for re-testing said software application.

14. The digital processing system of claim 13, wherein said finding, said identifying and said including said second set of test cases, are performed only if said dependency data is determined to be stale, and are not performed otherwise such that said re-testing is performed only with said first set of test cases.

15. The digital processing system of claim 13, further performing the actions of:
   receiving from a user, input data indicating that a third set of components of said plurality of components have been changed in addition to said first component;
   identifying a third set of test cases that cause execution of each component of said third set of components by performing a reverse look-up in said dependency data; and
   adding said third set of test cases to the test cases to be run for re-testing said software application.

16. The digital processing system of claim 15, wherein for said determining, said digital processing system performs the actions of receiving from said user an indication that said first component has been changed as part of said input data.

17. The digital processing system of claim 13, wherein said software application contains a plurality of classes, each class containing a corresponding set of methods,
   wherein each component of said plurality of components is a corresponding method of a corresponding class, said first component being a first method of a first class,
   wherein the sequence of components for a test case of said plurality of test cases is a sequence of methods invoked upon execution of the test case,
   wherein for determining the sequence of components for a test case, said digital processing system performs the actions of identifying first a set of classes having dynamic dependency with said first class and then a set of methods in the set of classes dynamically invoked by said first method.

* * * * *